A. S. KUX.
METHOD AND MEANS FOR PRODUCING CARTRIDGE CLIPS.
APPLICATION FILED MAR. 7, 1918.
1,295,769.
Patented Feb. 25, 1919.
8 SHEETS—SHEET 1.
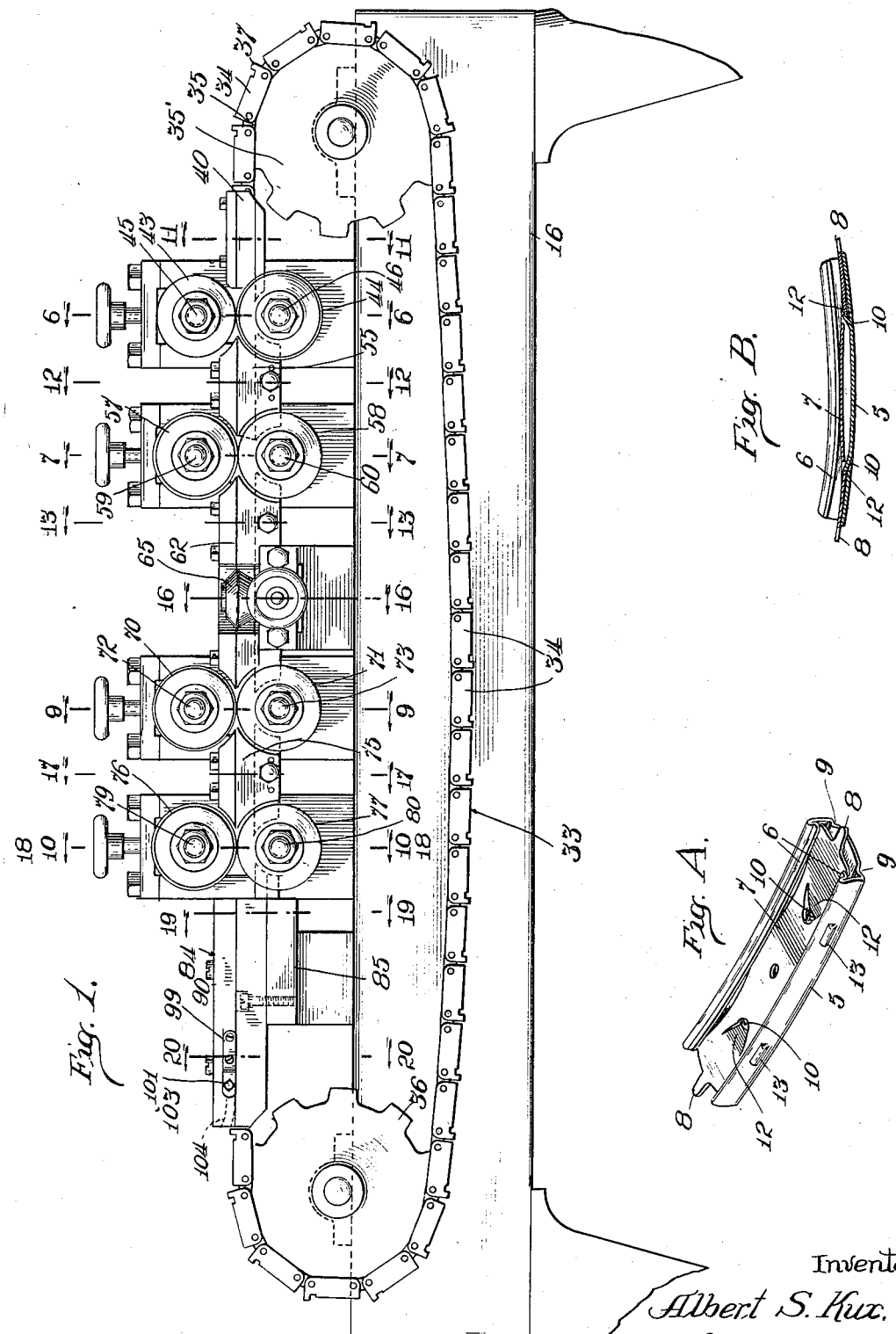
Inventor
Albert S. Kux.
By Williams, Bradbury & Lee
Attorneys A. S. KUX.
METHOD AND MEANS FOR PRODUCING CARTRIDGE CLIPS.
APPLICATION FILED MAR. 7, 1918.
1,295,769.
Patented Feb. 25, 1919.
8 SHEETS—SHEET 2.
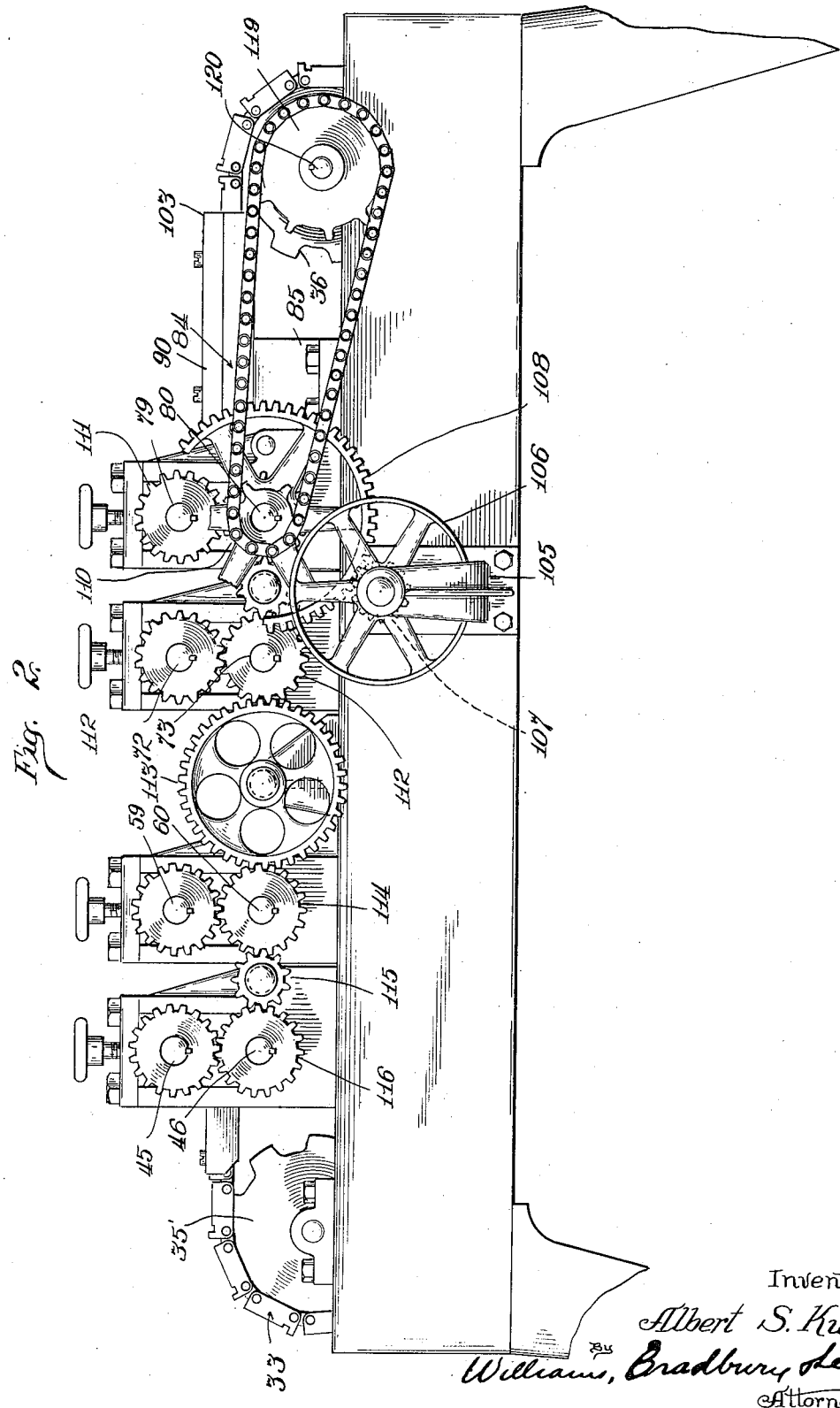
Inventor
Albert S. Kux
By Williams, Bradbury &c
Attorneys.

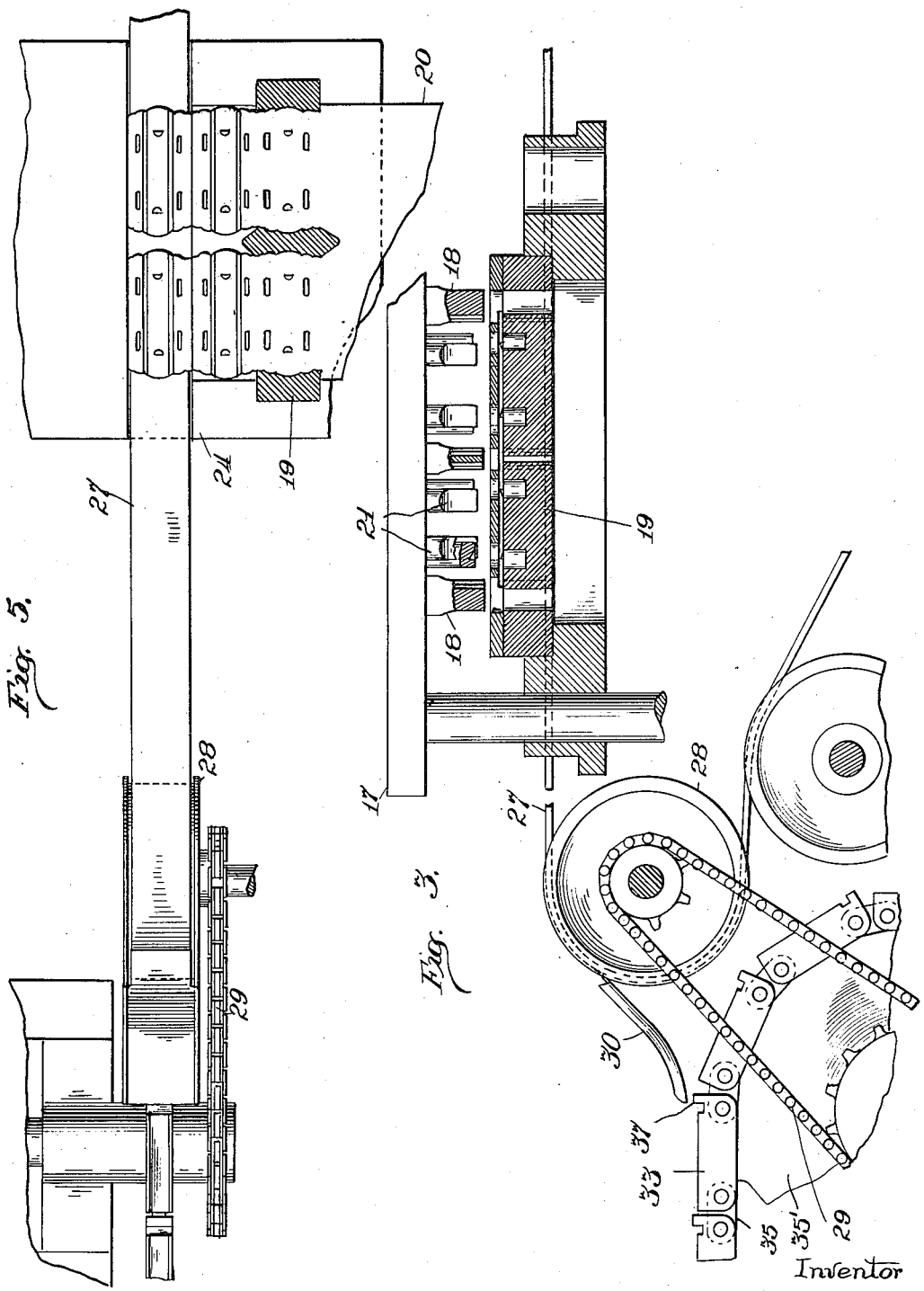

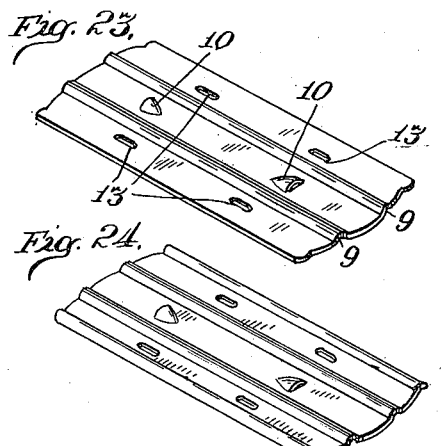
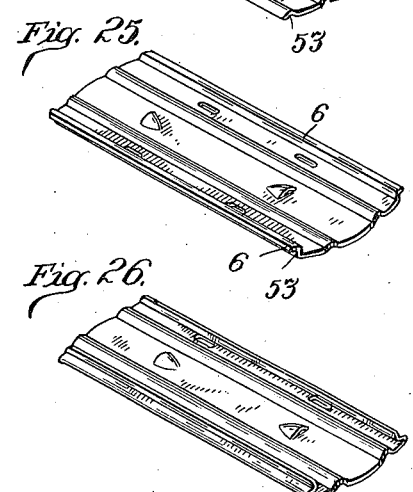
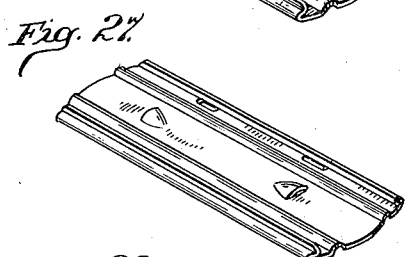
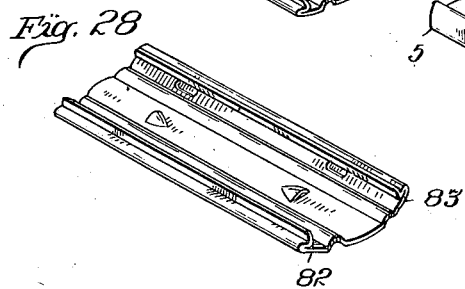
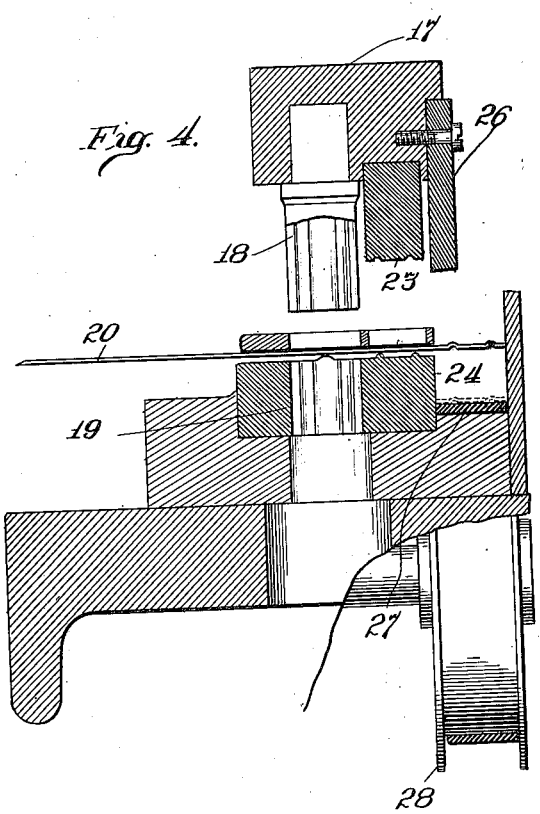
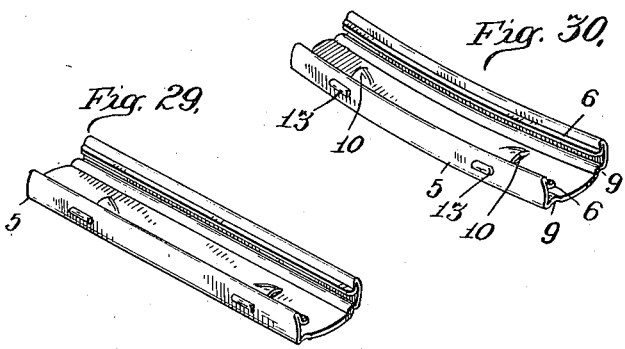

A. S. KUX.
METHOD AND MEANS FOR PRODUCING CARTRIDGE CLIPS.
APPLICATION FILED MAR. 7, 1918.

1,295,769.

Patented Feb. 25, 1919.
8 SHEETS—SHEET 5.

Inventor
Albert S. Kux
By William Bradbury
Attorneys

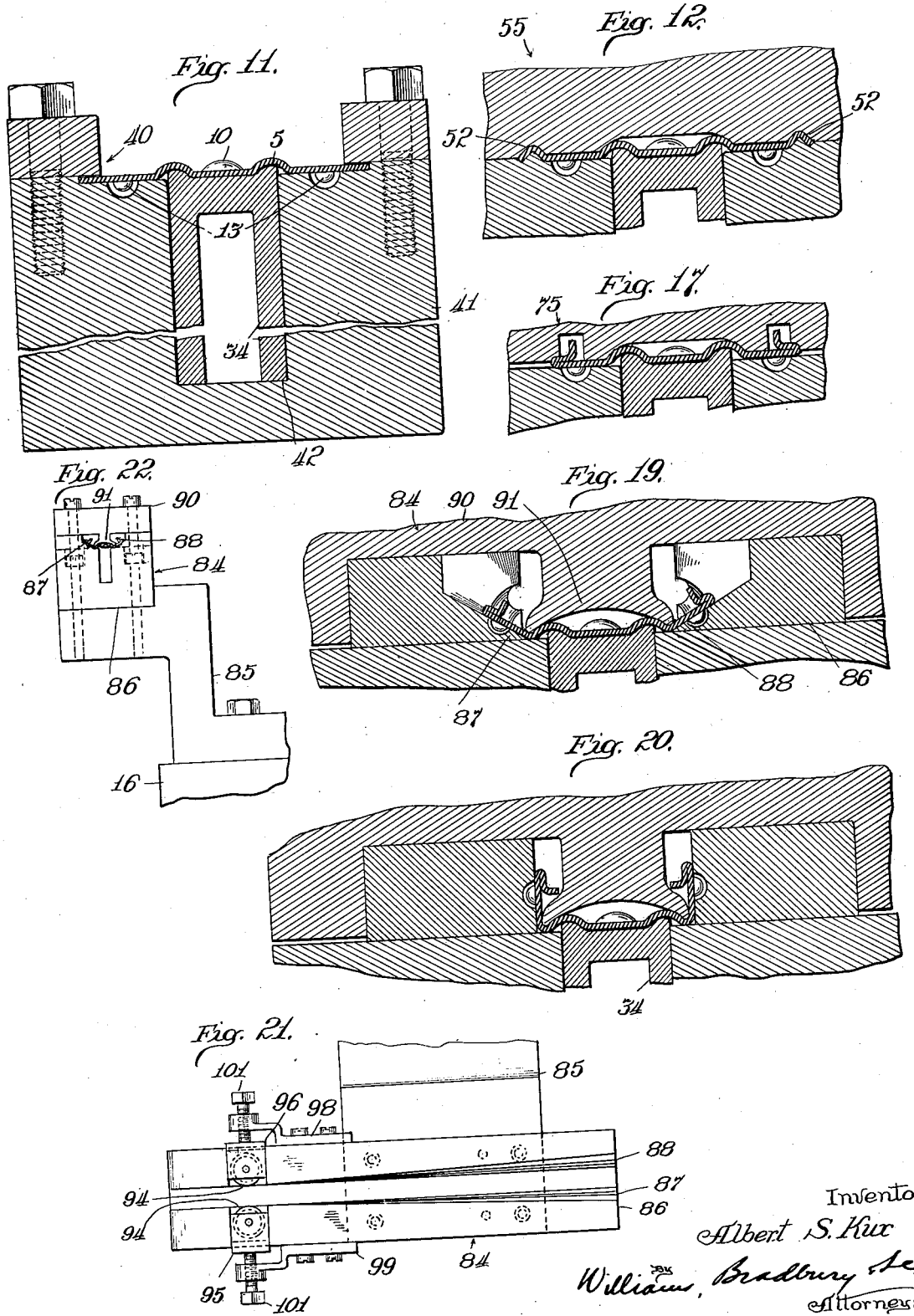

A. S. KUX.
METHOD AND MEANS FOR PRODUCING CARTRIDGE CLIPS.
APPLICATION FILED MAR. 7, 1918.
1,295,769.
Patented Feb. 25, 1919.
8 SHEETS—SHEET 7.
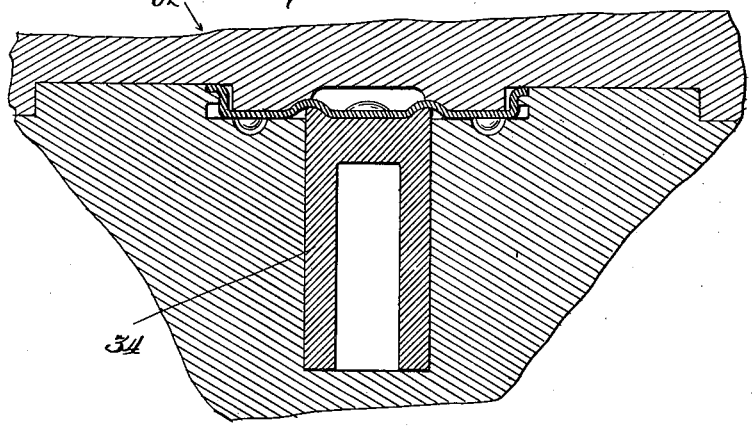
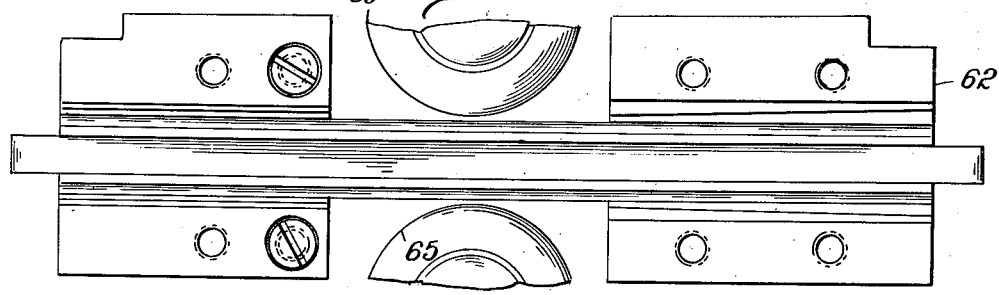
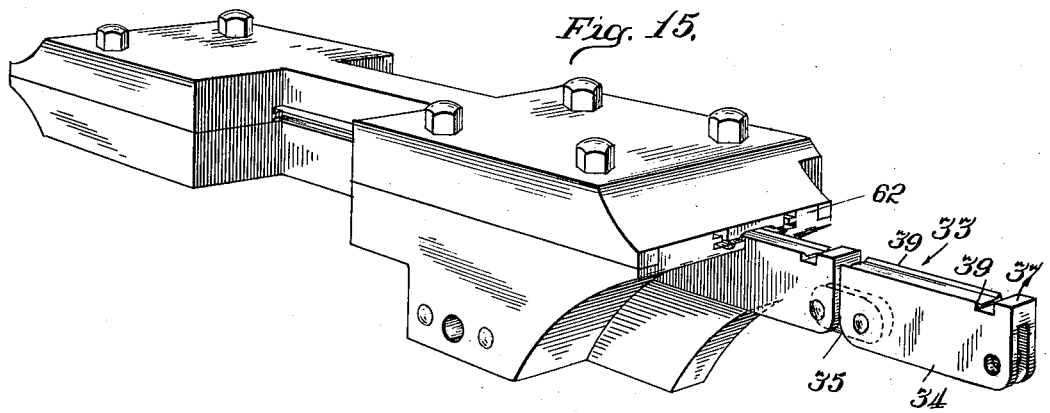
Inventor
Albert S. Kux.
Williams, Bradbury & Lee
Attorneys.

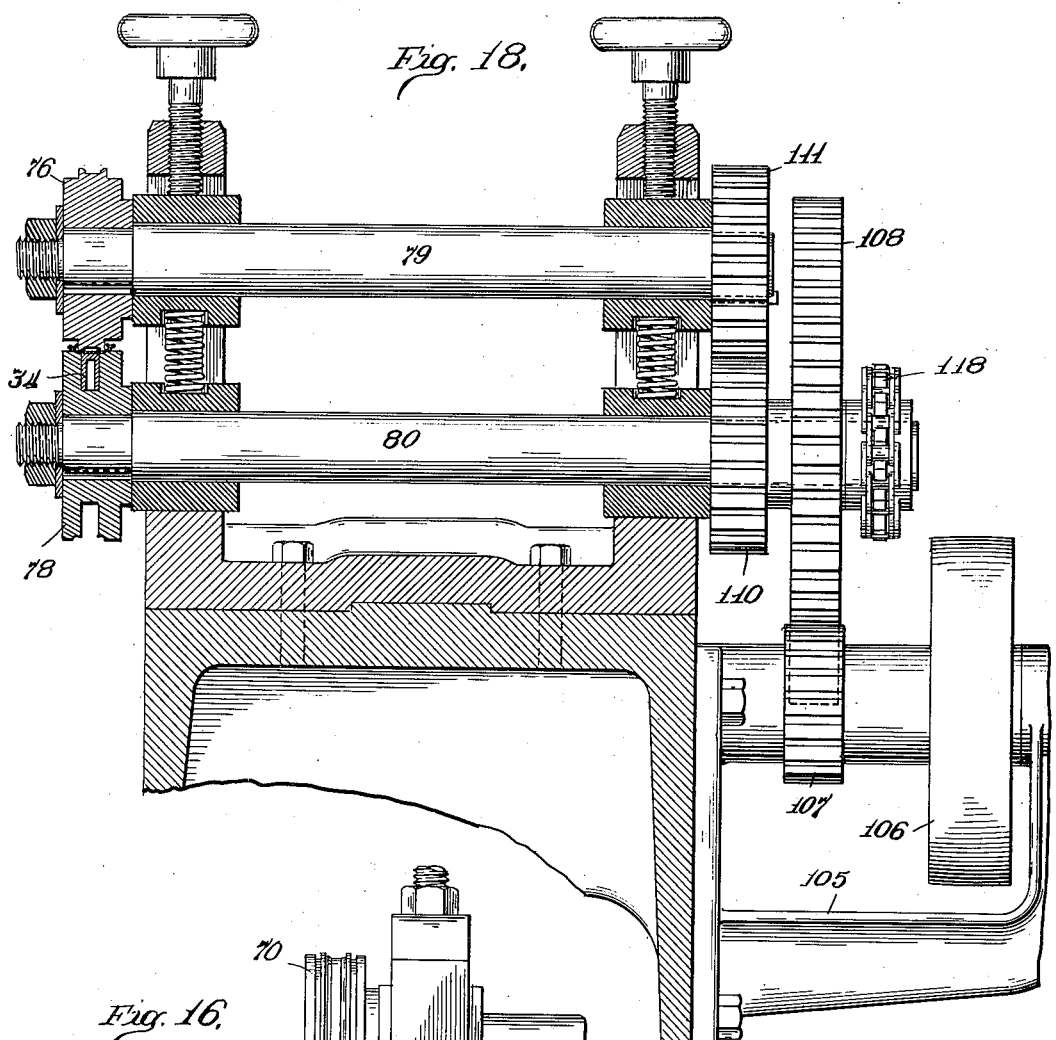
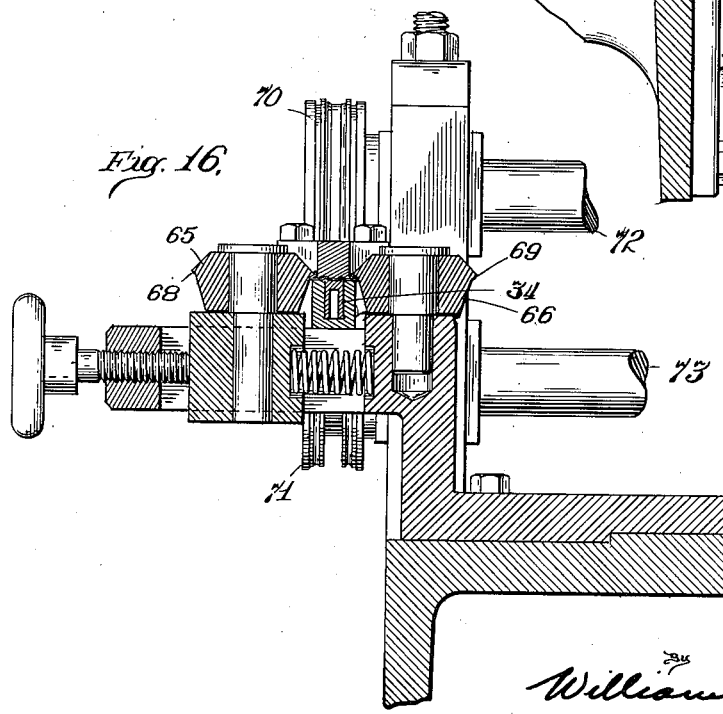

UNITED STATES PATENT OFFICE.

ALBERT S. KUX, OF CHICAGO, ILLINOIS, ASSIGNOR TO CHICAGO METAL PRODUCTS CO., OF CHICAGO, ILLINOIS, A CORPORATION OF ILLINOIS.

METHOD AND MEANS FOR PRODUCING CARTRIDGE-CLIPS.

1,295,769. Specification of Letters Patent. Patented Feb. 25, 1919.

Application filed March 7, 1918. Serial No. 221,011.

*To all whom it may concern:*

Be it known that I, ALBERT S. KUX, a citizen of the United States, residing at Chicago, in the county of Cook and State of Illinois, have invented certain new and useful Improvements in Methods and Means for Producing Cartridge-Clips, of which the following is a full, clear, concise, and exact description, reference being had to the accompanying drawings, forming a part of this specification.

My invention relates to methods and means of producing cartridge clips, and has for its object the provision of a method and means which will make it possible to produce cartridge clips at a much lower cost than has been possible heretofore. As cartridge clips are used merely as a convenient means of holding a desired number of cartridges prior to their insertion into a rifle and are only used once, it is extremely desirable that the cost be kept down. The type of cartridge clips now in general use consists of two members, a body member and a spring member, the body member adapted to receive the cartridges and the spring member adapted to hold the same in position. As the body member is provided with a number of upturned and flanged portions, it was necessary with the use of stamping machines to effect the upturning and flanging in separate operations, necessitating feeding and removing the blanks and partially formed clips from the machines several times. With the use of my invention it is necessary only to feed the blanks to the rolling machine, which performs the necessary folding operations, and to receive the finished body portion of the clip at the opposite end of the machine. The spring member of the clip may be made in a separate single stamping operation and inserted into the body portion. My invention will appear more fully as the description proceeds and by reference to the accompanying drawings, in which:

Figure A is a perspective view of the completed cartridge clip;

Fig. B is a vertical sectional view of the clip showing the spring member in place;

Fig. 1 is a front elevational view of the machine in my invention;

Fig. 2 is a view in elevation of the back of my machine;

Fig. 3 is a fragmentary view partially in section and partially in elevation of a means for forming the blanks used in making the body of the cartridge clip, and also illustrates a method of conveying the blanks from the said forming means to the rolling machine;

Fig. 4 is a sectional view of the forming means illustrated in Fig. 3;

Fig. 5 is a top view of the arrangement shown in Figs. 3 and 4;

Fig. 11 is a view taken on the line 11—11 of Fig. 1;

Fig. 12 is a sectional view taken on the line 12—12 of Fig. 1;

Fig. 13 is a sectional view taken on line 13—13 of Fig. 1;

Fig. 14 is a plan view of the parts illustrated in Figs. 8 and 13 and showing the relative position of the members.

Fig. 15 is a perspective view of the arrangement shown in Fig. 14;

Fig. 16 is a sectional view taken on the line 16—16 of Fig. 1;

Fig. 17 is a sectional view taken on the line 17—17 of Fig. 1;

Fig. 18 is a sectional view taken on the line 18—18 of Fig. 1, which in addition to showing the means of performing the fifth operation also illustrates the driving means and driving connections;

Fig. 19 is a view taken on the line 19—19 of Fig. 1;

Fig. 20 is a sectional view taken on the line 20—20 of Fig. 1;

Fig. 21 is a plan view of the parts shown in Figs. 19 and 20 and also illustrates the means for effecting the last steps in forming the body of the clip. In this view a cover plate has been removed to reveal the interior construction;

Fig. 22 is a view in elevation of the receiving end of the structure shown in Fig. 21 and shows the method of mounting.

Fig. 23 is a perspective view of the blank as it is fed to the rolling machine;

Fig. 24 is a perspective view of the blank after the first step has been performed;

Fig. 25 illustrates the partially formed clip after the second step has been performed;

Fig. 26 is a perspective view showing the third step completed;

Fig. 27 is a perspective view of the partially formed clip after it has received the fourth operation;

Fig. 28 illustrates the partially formed clip after the fifth step has been effected;

Fig. 29 is a perspective view of the body of the clip as substantially completed; and Fig. 30 is a view of the completed body portion of the clip.

Similar characters of reference refer to similar parts throughout the several views.

Figure 6:
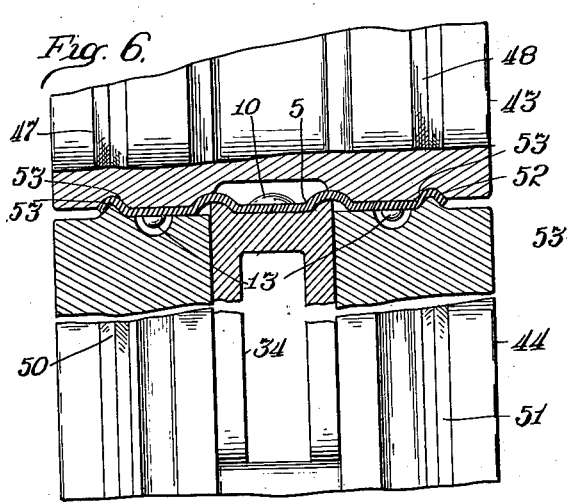
Fig. 6 is a view taken on the line 6—6 of Fig. 1.

Referring to Figs. A and B, which illustrate the completed clip, it will be seen that the same consists of a body member 5 having the longitudinal side portions turned up to form a pair of parallel walls. The free edges of the walls are flanged inwardly as at 6, 6 in order to form a retaining means. A flat spring member 7 having a projection 8 at each end thereof is inserted into the body of the clip so that the middle portion engages the under side of the flanges 6. In the base of the member 5 is stamped a pair of longitudinal grooves 9, 9 and a pair of projections 10, 10 arranged to form a retaining means for the spring member are provided to be engaged by the ears 12, 12 formed in the spring. As will be seen from the drawings the member 5 is curved longitudinally, the object of this curve being to keep the cartridges which are tapered in engagement. Cartridges are provided with an annular groove adjacent the cap, and the flanges 6, 6 are adapted to fit into the groove. In use the projections 8, 8 are upturned after the cartridges are inserted, in order to hold them in position. The spring member 7 also aids in holding the cartridges in radial position. A pair of projections 13, 13 are provided on each of the side walls of the clip the purpose of these projections being to provide a means of preventing the insertion of the clip into the opening in the rifle provided for the reception of the shells.

I shall first describe the means for preparing and feeding the blanks to the rolling machine. This means is illustrated in Figs. 3 to 5 and comprises a movable member 17 carrying a set of punch members 18 coöperating with a female member 19 arranged to receive a sheet of metallic material 20 and cut the same as most clearly illustrated in Fig. 5. This means is also provided with suitable punch members 21 arranged to form the projections 10, 10 and 13, 13. As the sheet of material is fed and advanced to lie between the die members 23 and 24 the longitudinal grooves 9, 9 will be formed by movement of the punch into contact with the metal. The material is again advanced and is sheared into blanks by the shearing member 26, which is also carried by the member 17. A conveyer belt 27 passes over a pulley 28 and is disposed under the shearing member 26 in order to receive the blanks after they are sheared. The pulley 28 has a driving connection 29 with the rolling machine so that the blanks may be carried to the chute 30 and delivered to the rolling machine. In order to convey the blanks and partially formed clips between the various guides and rollers of the rolling machine I have provided a conveyer chain 33 consisting of carrying links 34 and connected together by means of suitable links 35. The chain 33 passes over the spur gear 35' and the spur gear 36 which receives driving connection, as will appear presently. Each of the links 34 is provided with flanged sides 39, 39 which permit the blank having the longitudinal grooves 9, 9 to rest upon the top of the link member and prevent the blank from moving sidewise. A shoulder 37 is also provided to present an abutment to the blanks as they are delivered from the chute 30 to the chain 33, whereby the blanks are drawn through the rollers and guides of the machine.

Figure 7:
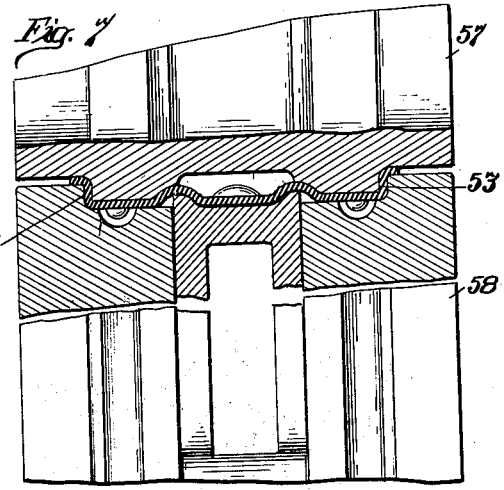
Fig. 7 is a view taken on the line 7—7 of Fig. 1.
Figure 8:
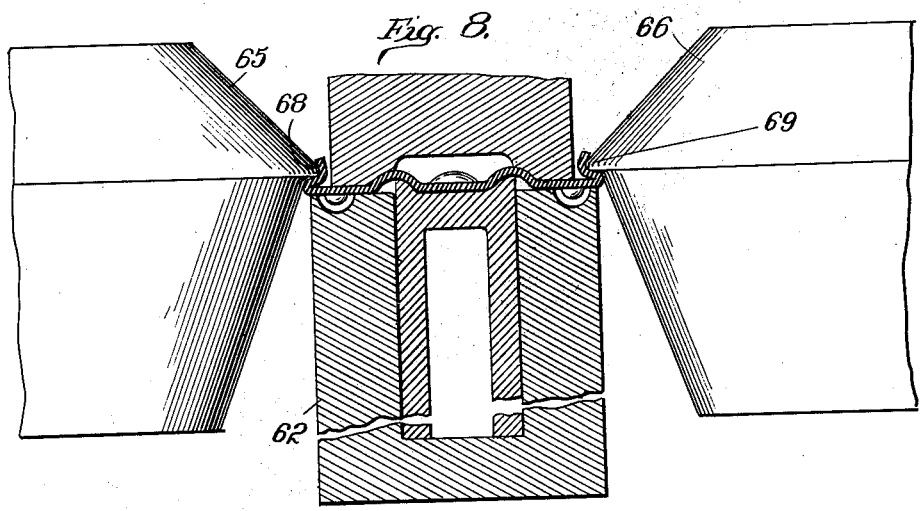
Fig. 8 is a view partly in section and partly in elevation of the means for forming the third operation.
Figure 9:
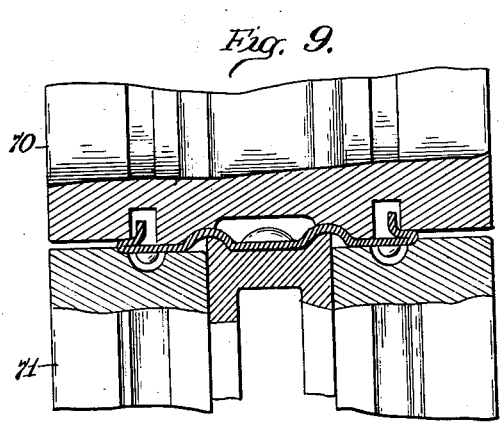
Fig. 9 is a view taken on the line 9—9 of Fig. 1.
Figure 10:
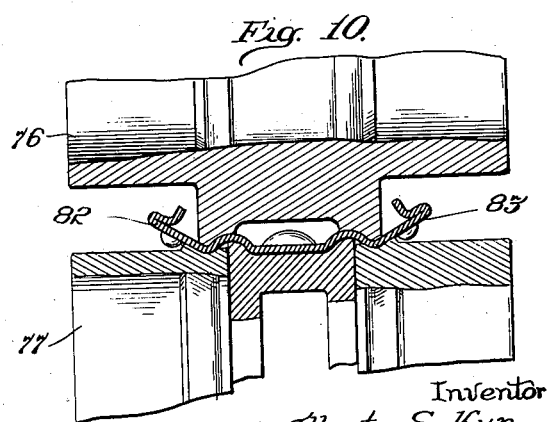
Fig. 10 is a view taken on line 10—10 of Fig. 1.

After the blank is deposited on the conveyer chain it passes through the guide member 40, shown in section in Fig. 11. The guide member 40 having a lower support 41, is bifurcated at 42 in order to allow movement of the chain through the guide member. The lower part 41 of the guide 40 has a pair of grooves which permit the projections 13, 13 to pass without difficulty. As the blank carried by the chain passes from the guide 40 it is presented to the rollers 43 and 44 mounted on a pair of rotatable shafts 45 and 46. As most clearly shown in Fig. 6 the roller 43 has a pair of annular grooves 47 and 48 adapted to coöperate with a pair of corresponding ridges 50 and 51 on the roller 44. As the rollers 43 and 44 act upon the blank a pair of longitudinal ridges 52, 52 having inner walls 53, 53 are provided adjacent the edges of the blank. The clip with this step performed is illustrated in Fig. 24. The blank is then drawn through the guide member 55, which is shown enlarged in Fig. 12 and arranged to permit movement of the blank having the ridges 52, 52 formed therein. After leaving the guide 55 the blank is fed between the rollers 57 and 58 mounted on rotatable shafts 59 and 60. The rollers are illustrated in Fig. 7 and are arranged to upturn the inner walls 53 of the ridges 52, as shown in this view. Fig. 25 shows the clip after this operation has been performed. The partially formed clip is then fed through a guide 62, between coöperating rollers 65 and 66 mounted on rotatable shafts having their axes vertically disposed. As the partially formed clip is advanced between the rollers 65 and 66 the annular flanges 68 and 69 of the rollers engage the walls 53 and cause their movement toward the body of the material as shown in Fig. 26. As illustrated in Fig. 16 the roller 65 coöperating with the roller 66 by having a spring disposed between the support for the roller 65 and the bracket which supports the roller 66. A hand piece is provided to engage the support for the roller 65 in order to secure the desired tension. The advancing chain carries the partially formed clip between a fourth pair of rollers 70 and 71 mounted on rotatable shafts 72 and 73, the roller 70 having a pair of circumferentially arranged grooves to receive the free ends of the partially formed clip. The portion of the roller adjacent these grooves is arranged to act upon the walls 53 to cause infolding contact with the body of the material, as shown in Figs. 9 and 27, after which the same is advanced through guide member 75 to rollers 76 and 77 mounted on rotatable shafts 79 and 80. The rollers 76 and 77 are arranged to receive the partially formed clip and the roller 76 having annular flanges coöperating with corresponding annular grooves in the roller 77 cause the upturning of a portion of the body of the blank at an angle of substantially thirty degrees, and to form a pair of walls 82 and 83, as shown in Figs. 10 and 28, after which the partially formed clip is fed toward a guiding and forming means 84 mounted on a bracket 85, which in turn is secured to the base 16. The lower forming means comprises a lower cam member 86 having side walls 87 and 88 formed at an angle of substantially thirty degrees at the receiving end and tapering gradually to substantially vertical position near the opposite end. Secured to the cam member 86 is a cap or cover member 90 having a downwardly projecting portion 91 which is arranged to engage the top of the partially formed clip as it is drawn through the opening provided by the walls 87 and 88. The walls 82 and 83 engage the walls 87 and 88 of the cam member 86, and are brought into substantially vertical position as they are drawn through the opening provided by the walls 87 and 88. It will be understood that while the walls 82 and 83 are being upturned the portion 91 holds the partially formed clip in engagement with the chain. I have found that in upturning the walls 82 and 83 to a vertical position the metal has a tendency to spring back toward its former position after leaving the walls 87 and 88, and I have therefore provided a pair of adjustable rollers 93 and 94, which rollers are provided with vertical axes and mounted in arms 95 and 96 respectively. In order that the rollers 93 and 94 may be adjusted I have provided a pair of arms 98 and 99 attached to the member 86 by means of bolts, the said arms each being adapted to carry set screws 101 arranged to engage the arms 95 and 96 to place the desired tension on the walls 82 and 83 of the clip. If the walls of the clip have sprung from a vertical position after leaving the walls 86 and 87, the same will be brought to a vertical position by passing through the rollers 93 and 94. To produce the curve on the body of the clip, as previously pointed out, a guide member 103 is provided having its opening curved upwardly as shown at 104 in dotted lines in Fig. 1. As the chain forces the clip through the guide member 103 the clip will follow the walls of the curved opening and the desired curve will be obtained.

Referring to Figs. 2 and 18, wherein I have illustrated the means of obtaining driving connection between the rollers and the sprocket wheels which carry the conveyer chain, it will be seen that a bracket 105 supports a pulley 106 mounted on a rotatable shaft, which also carries a pinion 107 meshing with the large gear 108 mounted on the shaft 80. The shaft 80 carrying a gear 110 meshes with a gear 111 on the shaft 79, and also meshes with a pinion disposed between the gear 110 and the gear 112 mounted on the shaft 73. A large gear 113 meshes with the gear 112 to obtain driving connection between the gear 113 and a gear 114 which in turn meshes with a pinion 115 to drive a gear 116. Thus, when the pulley 106 is connected with a motor or other driving means, driving connection is obtained between the motor and the shafts carrying the several rollers. The shaft 80 also carries at its outer end a gear 118 connected with a gear 119, mounted on the same shaft 120 which carries the spur gear 36.

While I have described my invention with respect to a certain embodiment thereof, I wish is to be understood that I do not limit myself to details of construction as illustrated in this application, as I understand that many modifications can be made in the shapes of the rollers to effect the desired folding and flanging and bending steps necessary to produce a cartridge clip.

Having thus described my invention, what I claim as new and desire to secure by Letters Patent of the United States is:

1. The herein described method of producing cartridge clips of blanks which consists in progressively rolling a ridge adjacent the longitudinal edges of the blank, upturning the inner side of the ridge to a substantially vertical position, progressively bending said inner side toward the body of the blank, progressively bending said inner side into infolding contact with the body of the blank, upturning a portion of the body of the blank to include the portions already acted upon, and progressively bending the upturned portions into substantially vertical position and curving the clip longitudinally.

2. The herein described method of producing cartridge clips of blanks which consists in progressively rolling a ridge adjacent the longitudinal edges of the blank, upturning the inner side of the ridge to a substantially vertical position, progressively bending said inner side toward the body of the blank, upturning a portion of the body of the blank to include the portions already acted upon, progressively bending the upturned portions into substantially vertical position and curving the clip longitudinally.

3. The herein described method of producing cartridge clips of blanks which consists in progressively rolling a ridge adjacent the longitudinal edges of the blank, upturning the inner side of the ridge to a substantially vertical position, progressively bending said inner side toward the body of the blank, progressively bending said inner side into infolding contact with the body of the blank, upturning a portion of the body of the blank to include the portions already acted upon, and progressively bending the upturned portions into substantially vertical position.

4. The herein described method of producing cartridge clips of blanks which consists in progressively rolling a ridge, upturning the inner side of the ridge to a substantially vertical position, progressively bending said inner side toward the body of the blank, and upturning a portion of the body of the blank to include the portions already acted upon.

5. The herein described method of producing cartridge clips of blanks which consists in progressively rolling a ridge adjacent the longitudinal edges of the blank, upturning the inner side of the ridge to a substantially vertical position, progressively bending said inner side toward the body of the blank, upturning a portion of the body of the blank to include the portions already acted upon, and progressively bending the upturned portions into substantially vertical position.

6. The herein described method of producing cartridge clips of blanks which consists in progressively rolling a ridge, upturning the inner side of the ridge to a substantially vertical position, progressively bending said inner side toward the body of the blank, progressively bending said inner side into infolding contact with the body of the blank, upturning a portion of the body of the blank to include the portions already acted upon, and progressively bending the upturned portions into substantially vertical position.

7. The method of producing cartridge clips which consists in feeding a sheet of metallic material, shearing the sheet into blanks, rolling a ridge adjacent the longitudinal edges of the blank, upturning the inner side of the ridge to a substantially vertical position, progressively bending said inner side toward the body of the blank, progressively bending said inner side into infolding contact with the body of the blank, upturning a portion of the body of the blank to include the portion already acted upon, progressively bending the upturned body portion into substantially vertical position, and curving the clip longitudinally.

8. The method of producing cartridge clips which consists in feeding a sheet of metallic material, progressively forming a plurality of projections and depressions, shearing the sheet into blanks, rolling a ridge adjacent the longitudinal edges of the blank, upturning the inner side of the ridge to a substantially vertical position, progressively bending said inner side toward the body of the blank, to include the portion already acted upon, progressively bending the upturned body portion into substantially vertical position, and curving the clip longitudinally.

9. The method of producing cartridge clips which consists in feeding a sheet of metallic material, progressively forming a pair of longitudinal grooves, shearing the sheet into blanks, rolling a ridge adjacent the longitudinal edges of the blank, upturning the inner side of the ridge to a substantially vertical position, progressively bending said inner side toward the body of the blank, progressively bending said inner side into infolding contact with the body of the blank, upturning a portion of the body of the blank to include the portion already acted upon, and progressively bending the upturned body portion into substantially vertical position.

10. A machine for making cartridge clips of blanks comprising a support, a pair of coöperating rollers mounted on the support and arranged to form a ridge adjacent the longitudinal sides of the blank, a second pair of rollers mounted on the support arranged to bend the inner side of the ridge into substantially vertical position, a third pair of rollers mounted on the support arranged to engage the upturned portion and bend the same toward the body of the blank, a fourth pair of rollers mounted upon the support arranged to engage the bent portion to cause infolding contact with the body of the blank, a fifth pair of rollers mounted on the support arranged to upturn a portion of the body of the blank on the longitudinal sides, means to receive the blank and continue the upturning to substantially vertical position, a sixth pair of rollers mounted on the support arranged to act against the sides of the clip to bring the side walls to substantially vertical position, and means to curve the clip longitudinally.

11. A machine for making cartridge clips of blanks, comprising a support, a pair of coöperating rollers mounted on the support and arranged to form a ridge adjacent the longitudinal sides of the blank, a second pair of rollers mounted on the support arranged to bend the inner side of the ridge into substantially vertical position, a third pair of rollers mounted on the support arranged to engage the upturned portion and bend the same toward the body of the blank, a fourth pair of rollers mounted upon the support arranged to engage the bent portion to cause infolding contact with the body of the blank, a fifth pair of rollers mounted on the support arranged to upturn a portion of the body of the blank on the longitudinal sides, means to receive the blank and continue the upturning to substantially vertical position, and a sixth pair of rollers mounted on the support arranged to act against the sides of the clip to bring the side walls to substantially vertical position.

12. A machine for making cartridge clips of blanks comprising rotatable means arranged to form a ridge adjacent the longitudinal sides of the blank and rotatable means arranged to bend the inner side of the ridge into substantially vertical position, rotatable means arranged to engage the upturned portions and bend the same toward the body of the blank, rotatable means arranged to engage the bent portion to cause infolding contact with the body of the blank, rotatable means arranged to upturn a portion of the body of the blank on the longitudinal sides, means to receive the blank and continue the upturning to substantially vertical position, and rotatable means arranged to act against the sides of the clip to bring the same to substantially vertical position.

13. A machine for making cartridge clips of blanks comprising means arranged to form a ridge adjacent the longitudinal sides of the blank, means arranged to bend the inner side of the ridge into substantially vertical position, means arranged to engage the upturned portions and bend the same toward the body of the blank, means arranged to engage the bent portion to cause infolding contact with the body of the blank, means arranged to upturn a portion of the body of the blank on the longitudinal sides, means to receive the blank and continue the upturning to substantially vertical position, and means arranged to act against the sides of the clip to bring the same to substantially vertical position.

14. A machine for making cartridge clips of blanks comprising adjustable means arranged to form a ridge adjacent the longitudinal sides of the blank, adjustable means arranged to bend the inner side of the ridge into substantially vertical position, adjustable means arranged to engage the upturned portions and bend the same toward the body of the blank, adjustable means arranged to engage the bent portion to cause infolding contact with the body of the blank, adjustable means arranged to upturn a portion of the body of the blank on the longitudinal sides, means to receive the blank and continue the upturning to substantially vertical position, and adjustable means arranged to act against the sides of the clip to bring the same to substantially vertical position.

15. A machine for making cartridge clips of blanks comprising rotatable means arranged to form a ridge adjacent the longitudinal sides of the blank, rotatable means arranged to bend the inner side of the ridge into substantially vertical position, rotatable means arranged to engage the upturned portions and bend the same toward the body of the blank, rotatable means arranged to upturn a portion of the body of the blank on the longitudinal sides, means to receive the blank and continue the upturning to substantially vertical position, and rotatable means arranged to act against the sides of the clip to bring the same to substantially vertical position.

16. A machine for making cartridge clips of blanks comprising means arranged to form a ridge adjacent the longitudinal sides of the blank, means arranged to bend the inner side of the ridge into substantially vertical position, means arranged to engage the upturned portions and bend the same toward the body of the blank, means arranged to upturn a portion of the body of the blank on the longitudinal sides, means to receive the blank and continue the upturning to substantially vertical position, and means arranged to act against the sides of the clip to bring the same to substantially vertical position.

17. A machine for making cartridge clips of blanks comprising adjustable means arranged to form a ridge adjacent the longitudinal sides of the blank, adjustable means arranged to bend the inner side of the ridge into substantially vertical position, adjustable means arranged to engage the upturned portions and bend the same toward the body of the blank, adjustable means arranged to upturn a portion of the body of the blank on the longitudinal sides, means to receive the blank and continue the upturning to substantially vertical position, and adjustable means arranged to act against the sides of the clip to bring the same to substantially vertical position.

18. A machine for making cartridge clips of blanks comprising rotatable means arranged to form a ridge adjacent the longitudinal sides of the blank, rotatable means arranged to bend the inner side of the ridge into substantially vertical position, rotatable means arranged to engage the upturned portions and bend the same toward the body of the blank, rotatable means arranged to engage the bent portion to cause infolding contact with the body of the blank, rotatable means arranged to upturn a portion of the body of the blank on the longitudinal sides, and means to receive the blank and continue the upturning to substantially vertical position.

19. A machine for making cartridge clips of blanks comprising means arranged to form a ridge adjacent the longitudinal sides of the blank, means arranged to bend the inner side of the ridge into substantially vertical position, means arranged to engage the upturned portions and bend the same toward the body of the blank, means arranged to engage the bent portion to cause infolding contact with the body of the blank, means arranged to upturn a portion of the body of the blank on the longitudinal sides, and means to receive the blank and continue the upturning to substantially vertical position.

20. A machine for making cartridge clips of blanks comprising adjustable means arranged to form a ridge adjacent the longitudinal sides of the blank, adjustable means arranged to bend the inner side of the ridge into substantially vertical position, adjustable means arranged to engage the upturned portions and bend the same toward the body of the blank, adjustable means arranged to engage the bent portion to cause infolding contact with the body of the blank, adjustable means arranged to upturn a portion of the body of the blank on the longitudinal sides, and means to receive the blank and continue the upturning to substantially vertical position.

21. A machine for making cartridge clips of blanks comprising rotatable means arranged to form a ridge adjacent the longitudinal sides of the blank, rotatable means arranged to bend the inner side of the ridge into substantially vertical position, rotatable means arranged to engage the upturned portions and bend the same toward the body of the blank, rotatable means arranged to upturn a portion of the body of the blank on the longitudinal sides, means to receive the blank and continue the upturning to substantially vertical position.

22. A machine for making cartridge clips of blanks comprising means arranged to form a ridge adjacent the longitudinal sides of the blank, means arranged to bend the inner side of the ridge into substantially vertical position, means arranged to engage the upturned portions and bend the same toward the body of the blank, means arranged to upturn a portion of the body of the blank on the longitudinal sides, and means to receive the blank and continue the upturning to substantially vertical position.

23. A machine for making cartridge clips of blanks comprising adjustable means arranged to form a ridge adjacent the longitudinal sides of the blank, adjustable means arranged to bend the inner side of the ridge into substantially vertical position, adjustable means arranged to engage the upturned portions and bend the same toward the body of the blank, adjustable means arranged to upturn a portion of the body of the blank on the longitudinal sides, and means to receive the blank and continue the upturning to substantially vertical position.

24. A machine for making cartridge clips of blanks comprising a rotatable means, said means adapted to form a ridge adjacent the longitudinal edges of a blank, rotatable means adapted to bend the inner wall of the ridge into substantially vertical position, rotatable means adapted to engage the upturned portion and move the same toward the body of the blank, rotatable means adapted to upturn the longitudinal sides of the body of the blank to include the portions already acted upon and to form a pair of walls, a guide member adapted to act upon the said walls and cause their movement toward a vertical position, rotatable means arranged to engage the walls and move the same to a substantially vertical position, the guide member arranged to curve the clip, and a conveyer chain adapted to receive the blanks and convey the same between the rollers, said conveyer chain comprising a plurality of links connected together and having an abutment to engage the blanks whereby they may be drawn through the guides and between the rollers.

25. A machine for making cartridge clips of blanks comprising a rotatable means, said means adapted to form a ridge adjacent the longitudinal edges of a blank, rotatable means adapted to bend the inner wall of the ridge into substantially vertical position, rotatable means adapted to engage the upturned portion and move the same toward the body of the blank, rotatable means adapted to cause infolding contact of the upturned portion with the body of the blank, rotatable means adapted to upturn the longitudinal sides of the body of the blank to include the portions already acted upon and to form a pair of walls, a guide member adapted to act upon the said walls and cause their movement toward a vertical position, the guide members arranged to curve the clip, driving means for said rotatable means, and a conveyer chain adapted to receive the blanks and convey the same between the rollers, said conveyer chain comprising a plurality of links connected together and having an abutment to engage the blanks whereby they may be drawn through the guides and between the rollers.

26. A machine for making cartridge clips of blanks comprising a rotatable means, said means adapted to form a ridge adjacent the longitudinal edges of a blank, rotatable means adapted to bend the inner wall of the ridge into substantially vertical position, rotatable means adapted to engage the upturned portion and move the same toward the body of the blank, rotatable means adapted to cause infolding contact of the upturned portion with the body of the blank, rotatable means adapted to upturn the longitudinal sides of the body of the blank to include the portions already acted upon and to form a pair of walls, a guide member adapted to act upon the said walls and cause their movement toward a vertical position, rotatable means arranged to engage the walls and move the same to a substantially vertical position, the guide members arranged to curve the clip, and a conveyer chain adapted to receive the blanks and convey the same between the rollers, said conveyer chain comprising a plurality of links connected together and having an abutment to engage the blanks whereby they may be drawn through the guides and between the rollers.

27. A machine for making cartridge clips of blanks comprising a rotatable means, said means adapted to form a ridge adjacent the longitudinal edges of a blank, rotatable means adapted to bend the inner wall of the ridge into substantially vertical position, rotatable means adapted to engage the upturned portion and move the same toward the body of the blank, rotatable means adapted to upturn the longitudinal sides of the body of the blank to include the portions already acted upon and to form a pair of walls, a guide member adapted to act upon the said walls and cause their movement toward a vertical position, the guide members arranged to curve the clip, and a conveyer chain adapted to receive the blanks and convey the same between the rollers, said conveyer chain comprising a plurality of links connected together and having an abutment to engage the blanks whereby they may be drawn through the guides and between the rollers.

28. A machine for making cartridge clips of blanks comprising a rotatable means, said means adapted to form a ridge adjacent the longitudinal edges of a blank, rotatable means adapted to bend the inner wall of the ridge into substantially vertical position, rotatable means adapted to engage the upturned portion and move the same toward the body of the blank, rotatable means adapted to cause infolding contact of the upturned portion with the body of the blank, rotatable means adapted to upturn the longitudinal sides of the body of the blank to include the portions already acted upon and to form a pair of walls, a guide member adapted to act upon the said walls and cause their movement toward a vertical position, rotatable means arranged to engage the walls and move the same to a substantially vertical position, the guide members arranged to curve the clip, driving means for said rotatable means, and a conveyer chain adapted to receive the blanks and convey the same between the rollers.

29. An apparatus for making cartridge clips of blanks comprising means for receiving a sheet of material, and means for providing a plurality of projections and depressions, a forming device for providing a pair of longitudinal grooves in said material, means for cutting said material into blanks, a conveyer disposed to receive and convey said blanks, a roller machine comprising rotatable means arranged to form a ridge adjacent the longitudinal edges of the blank, a rotatable means adapted to bend the inner wall of the ridge into substantially vertical position, rotatable means adapted to engage the upturned portion and move the same toward the body of the metal, rotatable means adapted to upturn the longitudinal side of the blank to include the portions already acted upon, means adapted to act upon the upturned sides and cause their movement toward a vertical position, and a conveyer chain adapted to receive the blanks and convey the same.

30. An apparatus for making cartridge clips of blanks comprising means for receiving a sheet of material, a forming device for providing a pair of longitudinal grooves in said material, means for cutting said material into blanks, a conveyer disposed to receive and convey said blanks, a rolling machine comprising rotatable means arranged to form a ridge adjacent the longitudinal edges of the blank, a rotatable means adapted to bend the inner wall of the ridge into substantially vertical position, rotatable means adapted to engage the upturned portion and move the same toward the body of the metal, rotatable means adapted to upturn the longitudinal side of the blank to include the portions already acted upon, means adapted to act upon the upturned sides and cause their movement toward a vertical position, and a conveyer chain adapted to receive the blanks and convey the same.

31. An apparatus for making cartridge clips of blanks comprising means for receiving a sheet of material, and means for providing a plurality of projections and depressions, a forming device for providing a pair of longitudinal grooves in said material, means for cutting said material into blanks, a conveyer disposed to receive and convey said blanks, a rolling machine comprising rotatable means arranged to form a ridge adjacent the longitudinal edges of the blank, a rotatable means adapted to bend the inner wall of the ridge into substantially vertical position, rotatable means adapted to engage the upturned portion and move the same toward the body of the metal, rotatable means adapted to upturn the longitudinal side of the blank to include the portions already acted upon, and means adapted to act upon the upturned sides and cause their movement toward a vertical position.

32. An apparatus for making cartridge clips of blanks comprising means for receiving a sheet of material, means for cutting said material into blanks, a conveyer disposed to receive and convey said blanks, a rolling machine comprising rotatable means arranged to form a ridge adjacent the longitudinal edges of the blank, a rotatable means adapted to bend the inner wall of the ridge into substantially vertical position, rotatable means adapted to engage the upturned portion and move the same toward the body of the metal, rotatable means adapted to upturn the longitudinal side of the blank to include the portions already acted upon, means adapted to act upon the upturned sides and cause their movement toward a vertical position, and a conveyer chain adapted to receive the blanks and convey the same.

33. An apparatus for making cartridge clips of blanks, comprising means for receiving a sheet of material, a forming device for providing a pair of longitudinal grooves in said material, means for cutting said material into blanks, a rolling machine comprising rotatable means arranged to form a ridge adjacent the longitudinal edges of the blank, a rotatable means adapted to bend the inner wall of the ridge into substantially vertical position, rotatable means adapted to engage the upturned portion and move the same toward the body of the metal, rotatable means adapted to upturn the longitudinal side of the blank to include the portions already acted upon, means adapted to act upon the upturned sides and cause their movement toward a vertical position, and a conveyer chain adapted to receive the blanks and convey the same.

34. An apparatus for making cartridge clips of blanks comprising means for receiving a sheet of material, and means for providing a plurality of projections and depressions, means for cutting said material into blanks, a rolling machine comprising rotatable means arranged to form a ridge adjacent the longitudinal edges of the blank, a rotatable means adapted to bend the inner wall of the ridge into substantially vertical position, rotatable means adapted to engage the upturned portion and move the same toward the body of the metal, rotatable means adapted to upturn the longitudinal side of the blank to include the portions already acted upon, means adapted to act upon the upturned sides and cause their movement toward a vertical position, and a conveyer chain adapted to receive the blanks and convey the same.

35. An apparatus for making cartridge clips of blanks comprising means for receiving a sheet of material, and means for providing a plurality of projections and depressions, a forming device for providing a pair of longitudinal grooves in said material, means for cutting said material into blanks, a conveyer disposed to receive and convey said blanks, and means disposed adjacent the conveyer to receive the blanks.

36. The combination with means for forming blanks having spaced longitudinal grooves of a chain conveyer for receiving said blanks, the links of said conveyer being provided with ribs for engaging the walls of said grooves, and means adjacent said conveyer for turning the longitudinal edges of said blanks at an angle to the central portions thereof.

In witness whereof, I hereunto subscribe my name this 5th day of March, 1918.

ALBERT S. KUX.

Witnesses:
 HARRY SCHUMACHER,
 K. BERTHOLD.